United States Patent
Pochowski

(10) Patent No.: US 7,552,370 B2
(45) Date of Patent: Jun. 23, 2009

(54) APPLICATION SPECIFIC DISTRIBUTED TEST ENGINE ARCHITECTURE SYSTEM AND METHOD

(76) Inventor: Robert Pochowski, 817 Logan Ct., Sunnyvale, CA (US) 94087

( * ) Notice: Subject to any disclaimer, the term of this patent is extended or adjusted under 35 U.S.C. 154(b) by 0 days.

(21) Appl. No.: 11/694,685

(22) Filed: Mar. 30, 2007

(65) Prior Publication Data

US 2007/0245199 A1    Oct. 18, 2007

Related U.S. Application Data

(60) Provisional application No. 60/787,769, filed on Mar. 31, 2006.

(51) Int. Cl.
| | |
|---|---|
| G11C 29/00 | (2006.01) |
| G01R 13/00 | (2006.01) |
| G01M 19/00 | (2006.01) |
| G06F 7/38 | (2006.01) |
| H03K 19/173 | (2006.01) |
| H03K 19/00 | (2006.01) |
| H01L 25/00 | (2006.01) |
| G01R 31/02 | (2006.01) |
| G01R 31/26 | (2006.01) |

(52) U.S. Cl. .................. 714/718; 714/725; 714/726; 714/742; 702/122; 702/66; 326/38; 326/41; 326/16; 324/754; 324/765

(58) Field of Classification Search ................. None
See application file for complete search history.

(56) References Cited

U.S. PATENT DOCUMENTS

| 5,025,205 | A | * | 6/1991 | Mydill et al. ............. 324/73.1 |
|---|---|---|---|---|
| 5,557,559 | A | * | 9/1996 | Rhodes ..................... 702/118 |
| 5,736,850 | A | * | 4/1998 | Legal ...................... 324/158.1 |
| 5,805,610 | A | * | 9/1998 | Illes et al. ................. 714/738 |
| 6,025,708 | A | * | 2/2000 | Stickler ................... 324/158.1 |
| 6,028,439 | A | * | 2/2000 | Arkin et al. ................ 324/765 |
| 6,219,289 | B1 | * | 4/2001 | Satoh et al. ................ 365/201 |
| 6,255,843 | B1 | * | 7/2001 | Kurihara ................... 324/765 |
| 6,476,628 | B1 | * | 11/2002 | LeColst ..................... 324/765 |
| 6,557,128 | B1 | * | 4/2003 | Turnquist .................. 714/724 |
| 6,631,340 | B2 | * | 10/2003 | Sugamori et al. ........... 702/122 |
| 7,110,905 | B2 | * | 9/2006 | Le et al. .................... 702/118 |
| 7,262,616 | B2 | * | 8/2007 | Brueckner et al. .......... 324/755 |
| 7,301,327 | B1 | * | 11/2007 | Sabih et al. .............. 324/158.1 |

(Continued)

Primary Examiner—Cynthia Britt
Assistant Examiner—Guerrier Merant
(74) Attorney, Agent, or Firm—Fenwick & West LLP

(57) ABSTRACT

An Application Specific Distributed Test Engine (ASDTE) that provides an optimized set of test resources for a given application. The test engine resources, configuration, functionality, and even the number of test engines can be changed as different devices are tested, or as different test methodologies are used with the system. This can be done by including the test engine configuration as a part of the application files that are loaded during the system set-up. This approach differs from conventional testing systems which limit testing to a fixed, limited, or standard stimulus/response engine configuration intended to test a variety of devices. Some of the benefits of the Application Specific Distributed Test Engine Architecture include: (1) a very high test throughput, (2) the ability to adapt system functionality and capabilities to meet different and new, unforeseen device test requirements on a lot-by-lot basis on a production test floor, and (3) the ability to change the number of test engines to optimize tester channels and system utilization.

25 Claims, 16 Drawing Sheets

U.S. PATENT DOCUMENTS

2003/0074153 A1* 4/2003 Sugamori et al. ............ 702/122
2005/0154550 A1* 7/2005 Singh et al. ................. 702/108
2005/0246603 A1* 11/2005 Rottacker et al. ............ 714/742
2006/0015785 A1* 1/2006 Chun ......................... 714/724
2007/0096757 A1* 5/2007 Puente et al. ................ 324/761

* cited by examiner

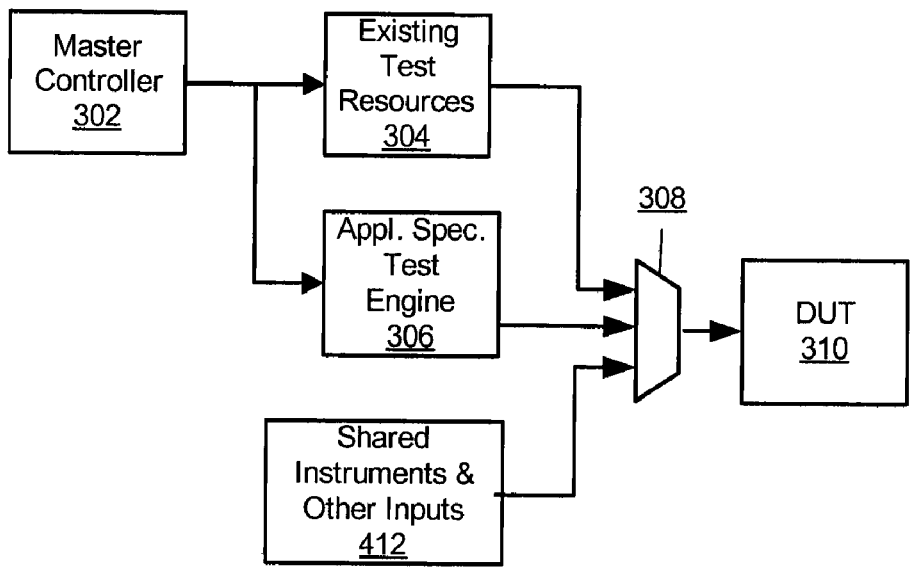
Figure 4
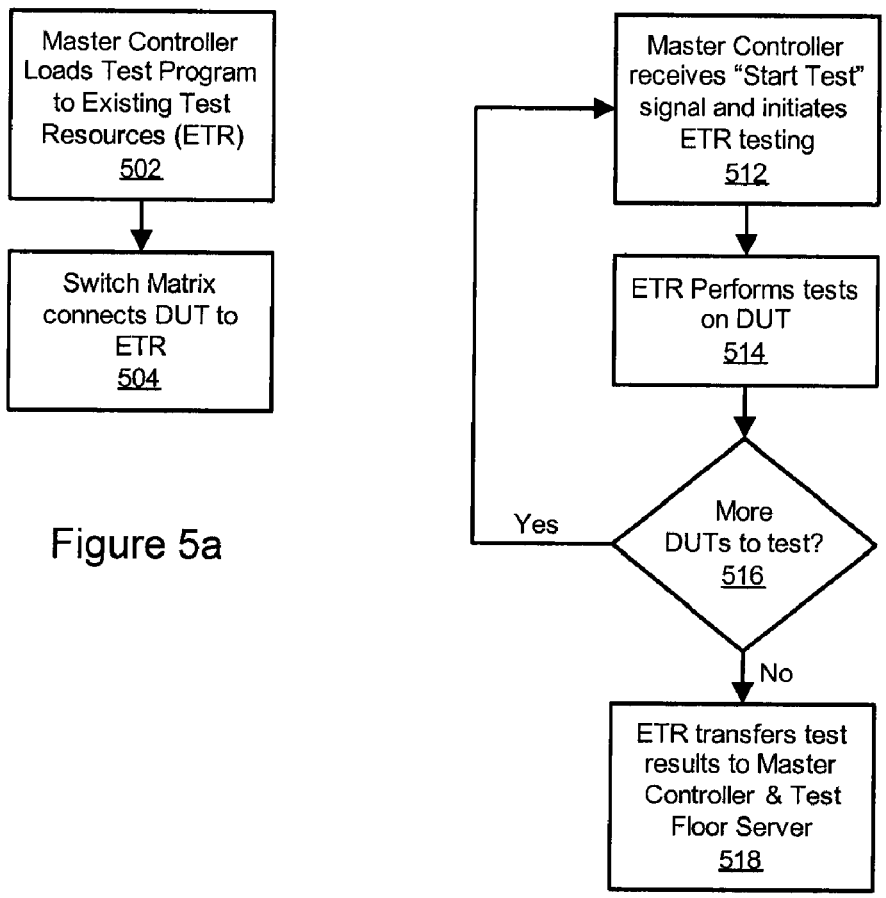
Figure 5a
Figure 5b

| | 4096 Tester Channels | | |
|---|---|---|---|
| Device Type | FPC (64 signal pins) | NAND / LPC (16 signal pins) | SPI / BIST (<= 8 signal pins) |
| System Parallel Test (DUTs) | 64 | 256 | >= 512 |

| | 8192 Tester Channels | | |
|---|---|---|---|
| Device Type | FPC (64 signal pins) | NAND / LPC (16 signal pins) | SPI / BIST (<= 8 signal pins) |
| System Parallel Test (DUTs) | 128 | 512 | >= 1024 |

Figure 12

APPLICATION SPECIFIC DISTRIBUTED TEST ENGINE ARCHITECTURE SYSTEM AND METHOD

RELATED APPLICATIONS

This application claims priority from U.S. provisional application No. 60/787,769 filed on Mar. 31, 2006 which is incorporated by reference herein in its entirety.

FIELD OF THE INVENTION

The application is in the field of computer test equipment and more particularly to distributed computer test equipment.

BACKGROUND OF THE INVENTION

The ability to efficiently and thoroughly test integrated circuits is a goal for manufacturers and purchasers. The complexity of conventional testing varies widely, as does the cost, from large scale automated test equipment to testing using simple test vectors. What such integrated circuit testing systems have in common is that existing test resources are connected to a Device Under Test (DUT) as shown in FIG. 1. This configuration provides dedicated tester resources to the DUT. These resources can include a control unit, a stimulus/response system and other support functions.

Semiconductor manufacturers have tried to lower test costs by increasing the number of devices tested in parallel with the test resources. One conventional technique that has been adopted, particularly for memory devices, is the "shared resource" architecture. FIG. 2 is an illustration of a conventional shared resource architecture. This architecture connects multiple DUTs to a central stimulus/response generation unit. The DUTs then share stimulus/response signals from the system. The shared DUT pins can be either directly tied together, or they can have separate buffers (pin electronics) to isolate the DUTs.

There are various problems with the shared resource approach. First, this approach becomes inefficient when the DUTs require special testing, e.g., redundancy, programmability, etc. In many cases, adding a second DUT to a shared stimulus/response generator only increases test throughput by a factor of 1.6-1.7 (versus an expected increase of 2.0). Higher parallel testing is even less efficient. Testing four devices with a shared resource system may only increase throughput by a factor of 2.5 (versus a factor of 4.0). Much of this introduced inefficiency is due to the sharing of the single stimulus/response system and the sharing of a single control unit. Second, this architecture often results in very complicated test programs since the program must be written to insure test integrity under all perturbations of pass/fail conditions of each device. Third, there can be electrical interactions between the DUTs that negatively affect test performance and integrity.

What is needed is a system and method for testing integrated circuits (1) that enable parallel testing while providing an efficient set of resources for various applications; (2) increases the throughput of an existing test systems; (3) increases the efficiency of test controllers by having a dedicated engine that implements and coordinates the test throughput; and/or (4) uses a memory mapped environment to simplify test programs for memory devices.

SUMMARY OF THE INVENTION

Embodiments of the invention include an Application Specific Distributed Test Engine (ASDTE) that provides an optimized set of test resources for a given application. The test engine resources, configuration, functionality, and even the number of test engines can be changed as different devices are tested, or as different test methodologies are used with the system. This is done by including the test engine configuration as a part of the application files that are loaded during the system set-up. This approach is unique in comparison to "standardized" implementations which limit testing to a fixed, limited, or "standard" stimulus/response engine configuration intended to test a variety of devices. Benefits of the Application Specific Distributed Test Engine Architecture include: (1) very high test throughput, (2) ability to adapt system functionality and capabilities to meet different and new, unforeseen device test requirements on a lot-by-lot basis on a production test floor, and (3) the ability to change the number of test engines to optimize tester channels and system utilization.

Another benefit of the present invention is increasing the throughput of an existing test system by adding dedicated stimulus/response engines. The application specific distributed test option (ASDTO) uses dedicated stimulus/response generators to increase parallelism and parallel test efficiency. This approach can be used for wafer sort, final test or other applications. Package test applications include the implementation of stimulus/response engines in "HYFIX" interfaces. Wafer test applications include the implementation of stimulus/response engines in, or connected to, Prober/Tester Interfaces (PTIs).

The Processor/T-State Test Engine embodiment of the present invention increases test throughput and simplifies test programs.

Embodiments of the present invention also provide a second system set of test capabilities to an existing test system. The ASDTO provides the ability to add a second level of test capabilities to an existing system while: (1) maintaining the existing test floor footprint and (2) maintaining compatibility with existing test software and hardware The Memory Mapped Device Under Test (DUT) Test Engine simplifies test programs and tests memory devices in an application environment.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 4 is an illustration of components of the ASDTO in accordance with one embodiment of the present invention.

FIGS. 5(a) and 5(b) are flow charts of the compatibility mode operation in accordance with one embodiment of the present invention.

FIG. 12 illustrates the effect of parallelism in environments with 4096 tester channels and 8192 tester channels in accordance with one embodiment of the present invention.

DETAILED DESCRIPTION OF THE INVENTION

Figure 1:
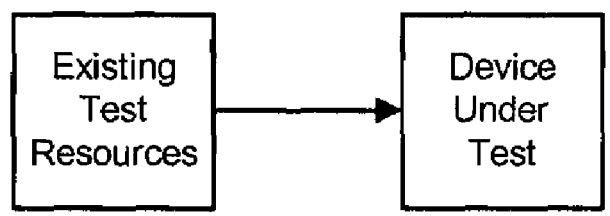
FIG. 1 is an illustration of a conventional one-to-one testing environment.
Figure 2:
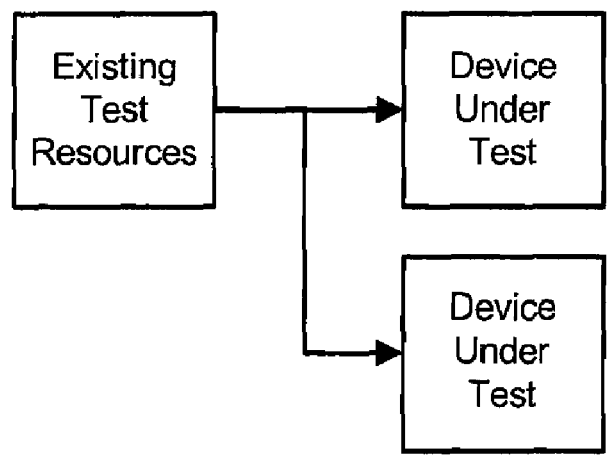
FIG. 2 is an illustration of a conventional shared resource testing environment.

A preferred embodiment of the present invention is now described with reference to the figures where like reference numbers indicate identical or functionally similar elements. Also in the figures, the left most digit(s) of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

A benefit of the Application Specific Distributed Test Engine Architecture (ASDTEA) of the present invention is to reduce the cost of testing integrated circuits. The ASDTEA will reduce the cost of test in at least two areas: (1) using the application specific distributed test option (ASDTO) and (2) using the application specific distributed test system (ASDTS). These areas are described below.

The ASDTEA can be made as a retrofit option to an existing test system using the ASDTO. This option will significantly increase the test throughput of both the test system and the related test cell capital equipment (handling equipment, etc.). The ASDTEA option can also increase the capabilities of the existing equipment. The increased capabilities will allow integrated circuit (IC) manufacturers to test new, more complex devices on the existing systems. The increased capabilities will also allow the manufacturers to utilize new test methodologies, such as Built in Self Test (BIST) and Low Pin Count (LPC) test structures on their existing test systems. The net result is a much longer, and more product useful life to their existing capital equipment investments.

The ASDTEA can also be used as the basis for a new system architecture, referred to herein as an application specific distributed test system (ASDTS). The ASDTEA stimulus/response test engine can be reconfigured and optimized per application (device type or test methodology). This optimization results in greater test throughput and simpler test program software. The reconfigurable stimulus/response engines also allow the IC manufacturers to adopt new test methodologies as they are introduced. The ability of the system to adapt to changing requirements means that it will be provide a long useful life. The ASDTEA also allows the system to test more devices in parallel as new, lower pin count test technologies are introduced by manufacturers. This increases system utilization and reduces test costs. Additional details about the ASDTO and the ASDTS are set forth below.

Figure 3:
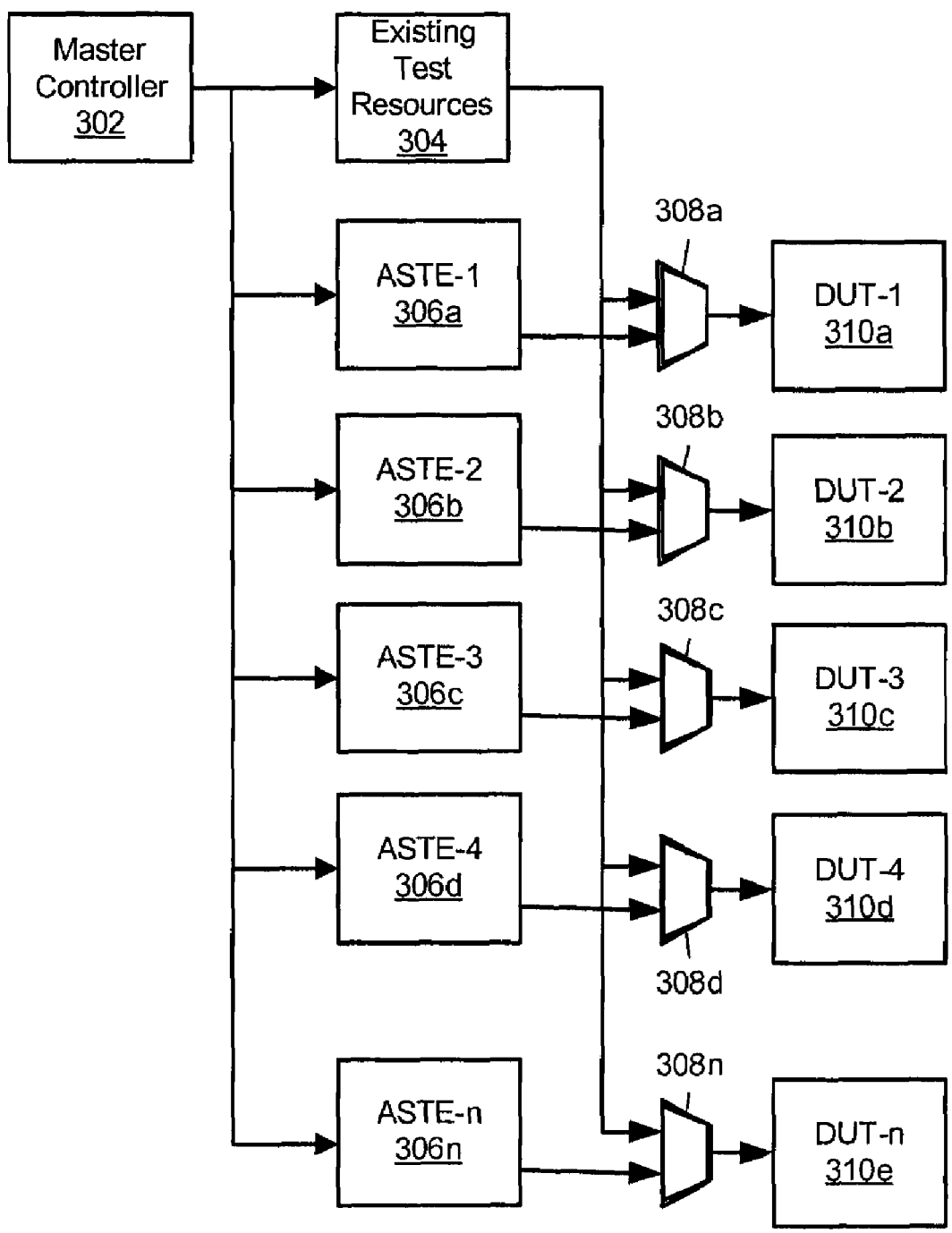
FIG. 3 is an illustration of an application specific distributed test option (ASDTO) in accordance with one embodiment of the present invention.

FIG. 3 is an illustration of an application specific distributed test option (ASDTO) in accordance with one embodiment of the present invention. The ASDTO provides an Application Specific Test Engine (ASTE) 306a-n for each device under test 310a-n. A switching matrix 308 enables each DUT 310 to be connected to either the ASTE 306 or the existing test resources 304. In addition there is a master controller 302 that controls the operation of the ASDTO. Features of the ASDTO can be seen from this block diagram are that the test system can test multiple devices in parallel and that the system can be operated in transparent mode. These features are described in greater detail below.

As described above, the existing test system is capable of testing more devices in parallel. Parallel testing can be doubled, quadrupled, or increased up to "n" devices. This is done by adding a dedicated stimulus/response generator (ASTE) 306 for each device under test. This is a unique approach to the problem of increasing the throughput of an existing test system. This approach has a number of benefits. First, test throughput is greatly improved. Depending on the application, throughput can double when a second device is tested (versus approximately 1.6 on a shared resource configuration). Further, throughput is quadrupled when four devices are tested in parallel (versus approximately 2.5 on a shared resource configuration). In general, adding "n" devices, increases test throughput by a factor of "n". In another embodiment, ASTEs 306 can be added with each ASTE 306 working with/testing multiple DUTs 310.

The ASDTO can also be run in "transparent" or compatibility mode. This allows the existing test resources 304 to access DUTs directly and therefore enables the use of existing test programs without modification. This is beneficial since device manufacturers may have invested significant resources into test program software for existing devices.

FIG. 4 is an illustration of components of the ASDTO in accordance with one embodiment of the present invention. A component of the ASTDO is the Application Specific Test Engine (ASTE) 306. The Application Specific Distributed Test Engine provides an optimized set of test resources for a given application. The test engine resources, configuration, functionality, and even the number of test engines can be changed as different devices are tested, or as different test methodologies are used with the system. This can be accomplished by including the test engine configuration as a part of the application files that are loaded during the system set-up. The loading of the application files can be controlled by the master controller 302 or the existing test system controller in the ETR (304). This approach is in contrast to conventional implementations which limit testing to a fixed, limited, or standard stimulus/response engine configuration intended to test a variety of devices. The Application Specific Test Engine 306 provides device manufacturers with a much higher level of test optimization and system flexibility/longevity.

The ASTE 306 is a self contained stimulus/response system which generates functional signals required to test the DUT 310. The ASTE 306 can contain Algorithmic Pattern Generators (APGs), Vector Generators, BIST test engines, and other functional signal sources, these functional signals are known to those skilled in the art. The ASTE 306 can also include a control processor 302 and other test functionality if the application requires it. A special implementation of the ASTE can be the Processor/T-State stimulus/response generator which is described below. The configuration of the Distributed Test Engine can be based upon the type of DUT 310 and test methodology used by the manufacturer. Examples of types of DUTs are flash memory (e.g., NOR flash, NAND flash), dynamic memory, mixed memory logic devices, microcontrollers, programmable logic devices, phase change memory, random logic devices, serial memory devices, parallel memory devices, low pin count devices, BIST devices, etc.

The ASTE 306 can be implemented to add test capabilities that are not available in the existing test resources. This capability can increase the application scope, test coverage, test integrity and useful life of existing test systems.

In one embodiment, the ASTE 306 is implemented with configurable logic technology, e.g., using field programmable gate arrays (FPGAs) or other programmable elements or memories, e.g., programmable logic devices (PLDs), complex programmable logic devices (CPLD), etc. For ease of reference we will describe the operation with reference to FPGAs, but any configurable logic device can be used. The FPGA technology can be used to provide the ability to change the stimulus/response engines per device or device family to optimize testing and can enable the test engines to be specific to various applications.

Another component of the ASDTO is the switching matrix 308. This matrix 308 allows the DUT 310 to be connected to the existing test resources 304, the ASTE 306, or a group of shared instruments/other inputs 412. In one embodiment, the switching matrix 308 is comprised of low impedance, high bandwidth switching elements such as high performance analog switches or relays. The ability to connect the DUT 304 to the shared instruments/other inputs 412 provides the ability to greatly expand test functionality (e.g. test analog or other types of functions not available on the existing test resources). The shared instruments 412 can be controlled by either the application specific test engines 306 or master controller 302.

Another component of the ASDTO is the master controller 302. The master controller 302 is a computer which can communicate to the system elements, system operator and test floor computer network. The master controller 302 can communicate directly with the existing test resource controller 304 (e.g., a computer), the ASTEs 306 and potentially the shared instruments 412. This communication link can be provided through an Ethernet or other high speed communications protocol. The master controller 302 can provide any combination of the following functions: (1) operator interface, (2) communications to test floor network and IT systems, (3) communications and control of device handling equipment and wafer probers, (4) downloads of application specific configuration files to the ASTEs 306, (5) downloads of test programs and test routines to the Existing Test Resources 304 and ASTEs 306, and/or (6) consolidation of test results It will be apparent that the master controller 302 can also perform other functions. The master controller 302 may, or may not be required depending on the application. Control can also be provided by an existing test resource controller (not shown) or other processing units.

A test cell configured with the Application Specific Distributed Test Option (ASDTO) can be run in different ways such as (1) compatibility mode (running existing test programs); (2) slave test engine mode, and (3) independent test engine mode, for example. Each of these modes is described in greater detail below.

The compatibility mode is used to run existing test programs. Device manufacturers can use this mode to allow testing of existing devices with existing test software and hardware. Compatibility mode uses the Existing Test Resources (ETR) 304 exclusively and does not use the ASTEs 306. The switching matrix 308 is set to connect the DUT 310 to the existing test resources 304. FIGS. 5(a) and 5(b) are flow charts of the compatibility mode operation in accordance with one embodiment of the present invention. With reference to FIG. 5(a), during the system set up (in the compatibility mode) the master controller 302 loads 502 a test program into the existing test resources 304. Then the switch matrix 308 connects 504 the DUT 310 to the existing test resources 504. With reference to FIG. 5(b), during the DUT test operation (in the compatibility mode) the master controller 302 receives 512 a start test signal and initiates testing using the existing test resources 304. The existing test resources 304 then performs 514 tests on the DUT 510. If 516 there are additional DUTs 310 to test the process continues at step 512, otherwise the existing test resources 304 transfers 518 the test results to the master controller 302 and a test floor server (not shown). Test system controllers (either the master controller 302, or ETR controller 304) are generally networked to one or more test floor servers.

Figure 6A:
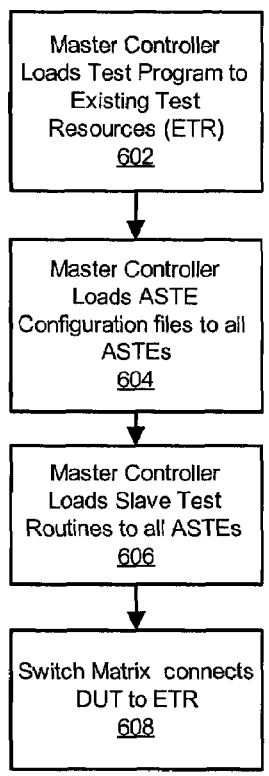
FIGS. 6(a) and 6(b) are flow charts of the slave mode operation in accordance with one embodiment of the present invention.
Figure 6B:
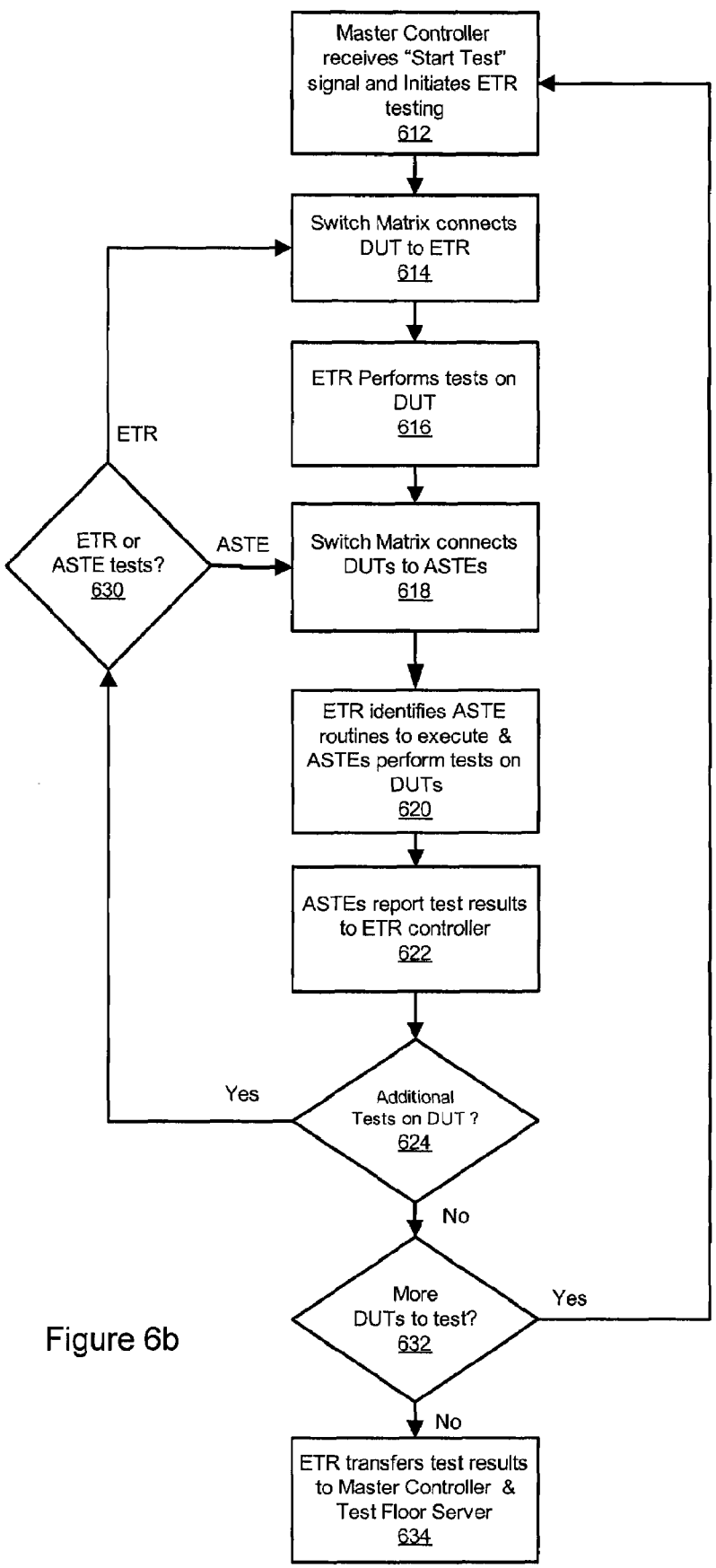

The slave test engine mode is used to increase the throughput of the existing test system or to add test capabilities by incorporating increased functionality in the ASTEs 306. Slave test mode uses both the existing test resources and the ASTEs during device testing. FIGS. 6(a) and 6(b) are flow charts of the slave mode operation in accordance with one embodiment of the present invention. FIG. 6(a) illustrates the system set-up operation for the slave test engine mode in accordance with one embodiment of the present invention. With reference to FIG. 6(a) the master controller 302 loads 602 test programs into the existing test resources (ETR). The master controller 302 also loads 604 application specific test engine configuration files to all ASTEs 306. The master controller 302 also loads 606 slave test routines to all ASTEs 306. Slave test routines are the test routines which will be executed by the Application Specific Test Engines 306. The switch matrix 308 then connects 608 the DUT 310 to the ETR 304.

FIG. 6(b) illustrates the DUT test methodology for the slave test engine mode in accordance with one embodiment of the present invention. The master controller 302 receives 612 a "start test" signal from an operator or a piece of automated handling equipment and initiates testing with the existing test resources 304. The switch matrix 308 connects 614 the DUT 310 to the ETR 304 (if not already connected) and the ETR 304 performs 616 tests on the DUT 310. The switch matrix 308 then connects 618 the DUTs 310 to the ASTEs 306. In alternate embodiment the connection 618 between DUTs 310 and ASTEs 306 can occur prior to the connection 614 between the DUT 310 and ETR 304. The ETR 304 then identifies 620 the ASTE routines to execute and the ASTEs 306 perform tests on the DUTs 310. The ASTEs 306 report the test results, e.g., pass/fail information, to an ETR controller or master controller 302. If 624 there are additional tests to be done on DUTs 310 then master controller 302 determines 630 whether the tests use the ETR 304 or an ASTE 306. If 630 the tests use the ETR 304 the process continues with step 614 (note that in some embodiments steps 618, 620 and 622 can be skipped if the only additional testing is for the ETR). If 630 the tests are for one or more ASTEs then the process continues with step 618. If 624 there are no additional tests then the master controller determines 632 whether there are additional DUTs 310 to test. If 624 there are additional tests the process continues with step 612, otherwise the ETR transfers 634 the test results to the master controller 302 and the test floor server.

In some embodiments of the present invention the tests run by the ASTEs are all run in parallel. Test throughput is enhanced by the ability of the multiple stimulus/response engines to asynchronously run different pattern flows needed by various applications. Test throughput is also enhanced by the parallel processing which can be performed by the control processors available on the test engines. These processors can perform operations such as device repair analysis, device reliability computations or other processor specific functions.

Figure 7:
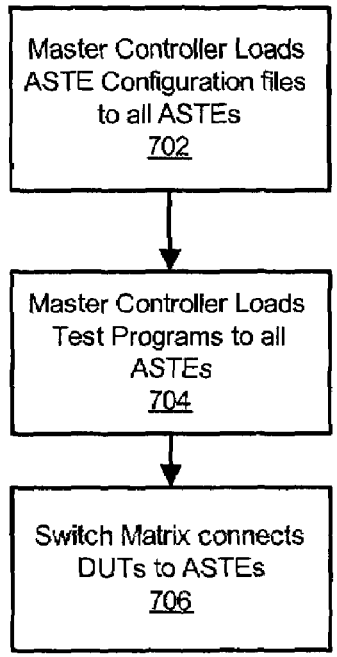
FIG. 7 is a flow chart of the independent test engine mode set up operation in accordance with one embodiment of the present invention.

The Independent Test Engine Mode can be used for new device test programs which do not need any of the test capabilities of the Existing Test Resources. Independent test mode uses the ASTEs exclusively. The switching matrix would be set to connect the DUT to the ASTEs. FIG. 7 is a flow chart of the independent test engine mode set up operation in accordance with one embodiment of the present invention. With reference to FIG. 7, the master controller 302 loads 702 application specific test engine configuration files to all ASTEs 306. The master controller 302 also loads 704 test programs to all ASTEs 306. The switch matrix 308 connects 706 DUTs 310 to ASTEs.

Figure 8:
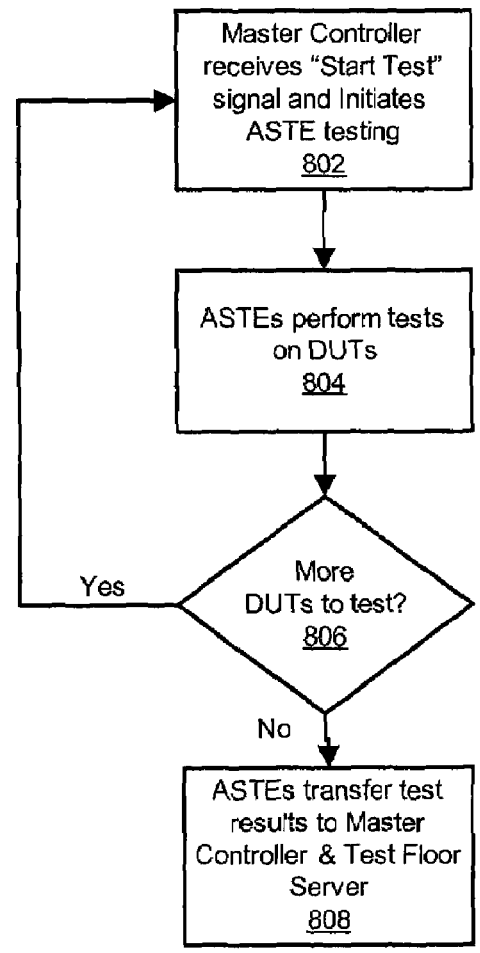
FIG. 8 is a flow chart of the independent test engine mode device under test (DUT) test operation in accordance with one embodiment of the present invention.

FIG. 8 is a flow chart of the independent test engine mode device under test (DUT) test operation in accordance with one embodiment of the present invention. The master controller 302 receives 802 the start test signal from an operator or piece of automated handling equipment and initiates ASTE 306 testing. The ASTEs 306 perform 804 tests on DUTs 310. If 806 there are additional DUTs 310 to test then the process continues at step 802. Otherwise 806 the ASTEs 306 transfer 808 test results to the master controller 302 and the test floor server.

Figure 9:
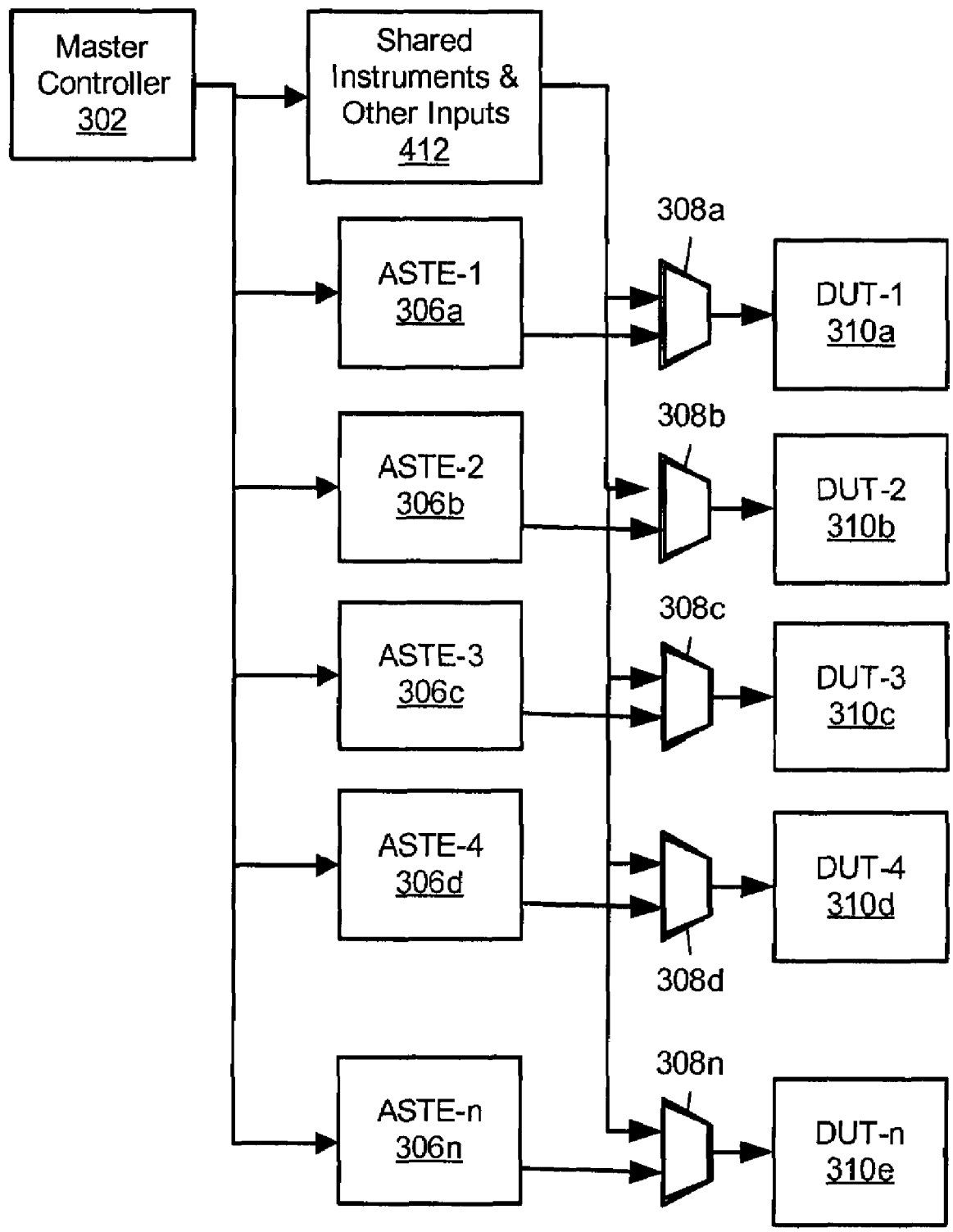
FIG. 9 is an illustration of an application specific distributed test system (ASDTS) environment in accordance with one embodiment of the present invention.

FIG. 9 is an illustration of an application specific distributed test system (ASDTS) environment in accordance with one embodiment of the present invention. The ASDTS is a complete test system based on the Application Specific Distributed Test Architecture. This architecture produces a test system with high test throughput and flexibility. Since the ASDTS is a new test system, the "Existing Test Resources" block 304 from the ASDTO is eliminated. The ASDTS continues to use an Application Specific Distributed Test Engine 306 for each DUT. The system architecture is extensible to "n" devices in parallel since each ASTE/DUT combination is a self contained element. As described above, in other embodiments, ASTEs 306 can be added with each ASTE 306 working with/testing multiple DUTs 310.

Figure 10:
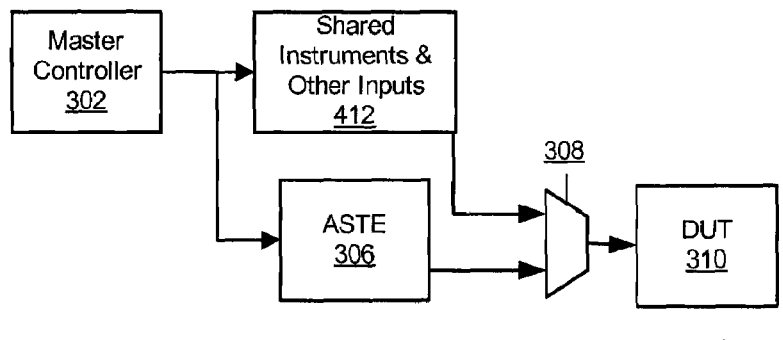
FIG. 10 is an illustration of components of the ASDTS in accordance with one embodiment of the present invention.

The ASDTS 1001 also preserves the capability to switch shared instrumentation 412 to the DUTs. This is done to increase system flexibility and upgradeability as new device test requirements evolve. FIG. 10 is an illustration of components of the ASDTS 1001 in accordance with one embodiment of the present invention. Components of the ASTDS 1001 are the Application Specific Test Engine (ASTE) 306, described above, the shared instruments and other inputs 412 (described above). Note that the terms ASTE and ASDTE are used interchangeably herein. The ASDTS also includes a switching matrix 308 (described above) and a master controller 302, described above.

The ASDTS 1001 operates in much the same way as the ASDTO in Independent Test Engine Mode, described above. The ASDTS master controller sets-up the test engines and then commences testing. The system set-up and DUT test flows operate in essentially the same manner as described above with reference to FIG. 7 and FIG. 8.

The ASDTS 1001 can be changed to provide testing for many different types of devices. This is done by loading different configuration files into the configurable logic, e.g., FPGAs that make up the ASDTEs. These configuration files are loaded with other device specific production test software files (e.g., test programs, prober/handler set-up files, etc.) as part of a manufacturing test set-up. This allows testing to be switched between different types of devices as demand changes in production. This is becoming a major issue for device manufacturers as they transition from classical full pin count testing to various forms of design for test (DFT) and BIST test modes.

Figure 11:
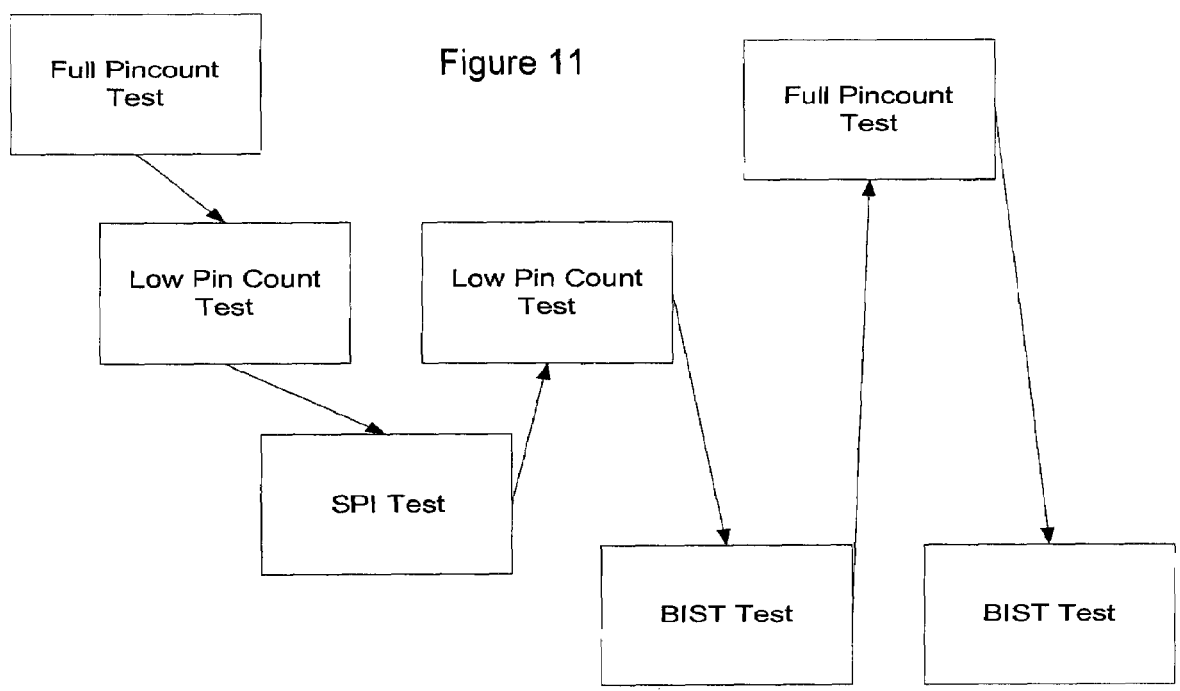
FIG. 11 is an illustration of the ASDTS configuration mode flexibility in accordance with one embodiment of the present invention.

FIG. 11 is an illustration of the ASDTS configuration mode flexibility in accordance with one embodiment of the present invention. ASDTS can be software configured to test Full Pin Count (FPC), Low Pin Count (LPC), Serial Peripheral Interface (SPI), Built-in Self Test (BIST) or other types of devices in a production environment. In contrast to conventional systems in which the testing program (stimulus/response engine) is initially stored but is not changed thereafter based upon changes in the type of device under test, the present invention provides configurable logic that enables a user to modify the stimulus/response engine functionality in the testing environment or during testing. It will be apparent that the user need not modify the stimulus/response engine functionality for every change in the type of DUT 310. This provides the user with an infinitely variable function set of stimulus/response engine functionality based upon the user's needs, e.g., based upon testing new devices and/or different types of devices. One example of a such a user modification can occur when the user wants to test a new device that is not capable of being properly tested with the currently programmed functionalities and/or capabilities of the currently programmed stimulus/response engine (ASTE). The present invention enables the user to obtain a new stimulus/response program that can be loaded into the stimulus/response engine in the testing environment, e.g., at the user's facility.

In addition to being able to change the type of ASDTEs, the FPGAs can be configured with a completely variable number of test engines. This allows the system to be configured to test a varying number of devices in parallel. Since a system has a finite number of hardware test channels, the maximum number of devices which can be tested in parallel is a function of the number of signal pins on a given device. The ASDTS can be configured to provide ASDTEs per the formula:

$$\text{Devices in parallel} = \frac{\text{Total Number of Tester Channels}}{\text{Number of } DUT \text{ Signal Pins}}$$

This allows manufacturers to maximize test throughput and capital equipment utilization. One goal can be to maximize parallel testing by achieving full channel utilization of the test system. FIG. 12 illustrates the effect of parallelism in environments with 4096 tester channels and 8192 tester channels in accordance with one embodiment of the present invention. It should be noted that even when the ASDTS tests more devices in parallel, there is minimal negative effect on the test time for each device due to the increase in ASDTEs. The result is high speed, highly parallel test.

The Processor/T-State Test Engine (PTSTE) 1300 is a control and stimulus response system. The PTSTE 1300 increases the test throughput and simplifies device test software. The PTSTE 1300 is one type of test engine that can be loaded into Application Specific Distributed Test Engine blocks in the ASDTO or the ASDTS. As described above, other types of Application Specific Distributed Test Engines (ASDTE/ASTE) includes Algorithmic Pattern Generators, Vector Generators, and other stimulus/response engines.

Figure 13:
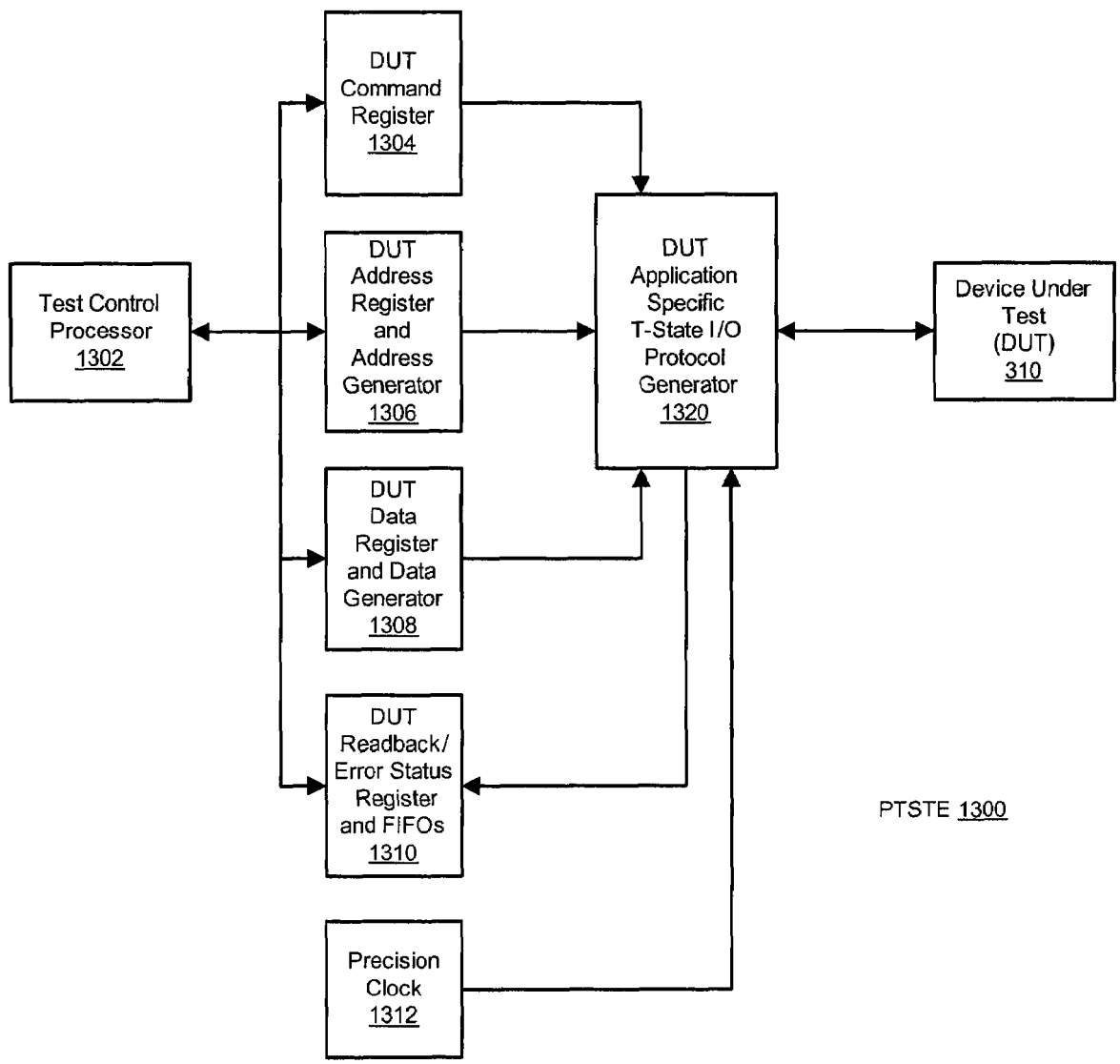
FIG. 13 is an illustration of a processor/T-state test engine (PTSTE) in accordance with one embodiment of the present invention.
Figure 14:
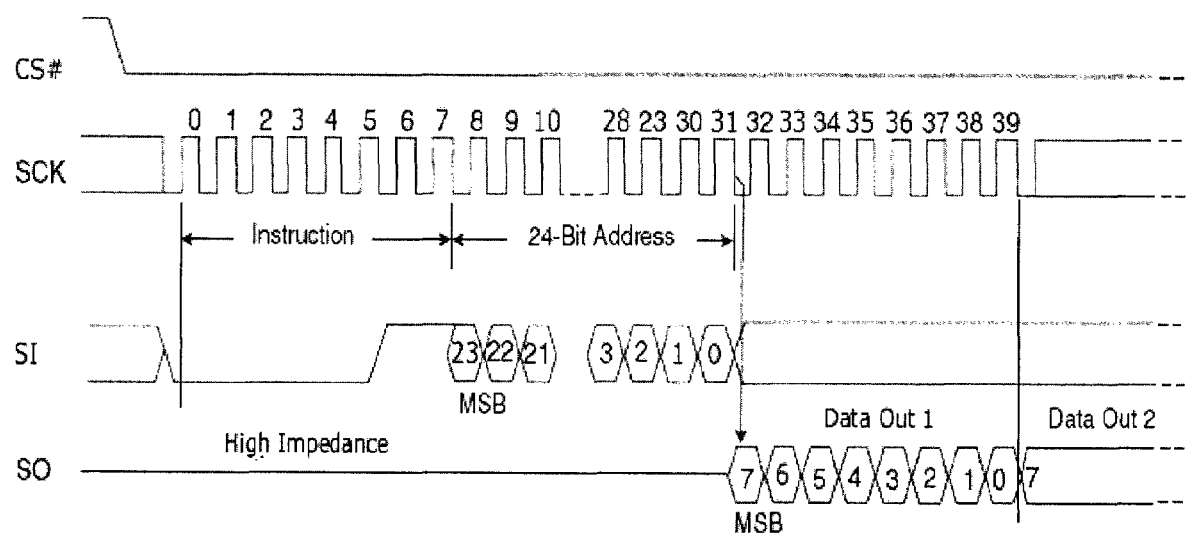
FIG. 14 is a timing diagram of a serial peripheral interface (SPI) device in accordance with one embodiment of the present invention.

FIG. 13 is an illustration of a processor/T-state test engine (PTSTE) 1300 in accordance with one embodiment of the present invention. The PTSTE 1300 simplifies communicating with the DUT 310. Examples of communicating with a DUT 310 are writing or reading data in a memory device. These types of operations can be performed hundreds of millions of times in the testing of a single memory device. Depending on the device's Input/Output protocol, a single read/write operation can be a long, complex series of signals. An example of a long, complex series of signals occurs for devices with low pin count, high bandwidth interfaces such as a serial peripheral interface (SPI). FIG. 14 is a timing diagram of a serial peripheral interface (SPI) device in accordance with one embodiment of the present invention. In particular, FIG. 14 is a timing diagram of one type of DUT, that is, the Spansion S25FL family of Serial Peripheral Interface (SPI) devices. With reference to FIG. 14, CS# refers to a chip select signal, SCK refers to serial clock signal, SI refers to a serial data input signal and, SO refers to a serial data output signal.

The PTSTE 1300 simplifies this type of DUT test operation by providing the user with the ability to specify the DUT address, DUT data, and DUT operation command then the PTSTE 1300 parses the information and delivers it to the DUT with the correct signal sequencing and timing. In addition, the signals can be delivered to the DUT 1300 at the highest bandwidth possible in order to reduce the time required to perform the operation and therefore improve test throughput.

The PTSTE 1300 includes a test control processor 1302 which controls the operation of the PTSTE 1300, a DUT command register 1304, a DUT address register and address generator 1306, a DUT data register and data generator 1308, a DUT readback/error status register and first in first out (FIFO) registers 1310, a precision clock 1312 and a DUT application specific T-State input/output (I/O) protocol generator 1320 (T-state protocol generator).

The DUT command register 1304 holds the "command" to be performed on the DUT, e.g., to write data to an address location. The DUT address register and address generator 1306 holds the DUT address on which to perform a read or write operation. The DUT data register and data generator 1308 holds the DUT data to be written into an address location. The DUT read back/error status register and first in first out (FIFO) registers 1310 holds DUT error information from operations or tests performed on the DUT. The precision clock 1312 enables the PTSTE 1300 to precisely interact with a DUT 1300. The T-state protocol generator 1320 generates the test patterns based upon the requirements of the DUT 310. The PTSTE 1300 takes some of the computing burden off of the master controller 302 and therefore enables the master controller 302 to control more ASTEs 306, including ASTE's that are a PTSTE 1300, for example.

Figure 16:
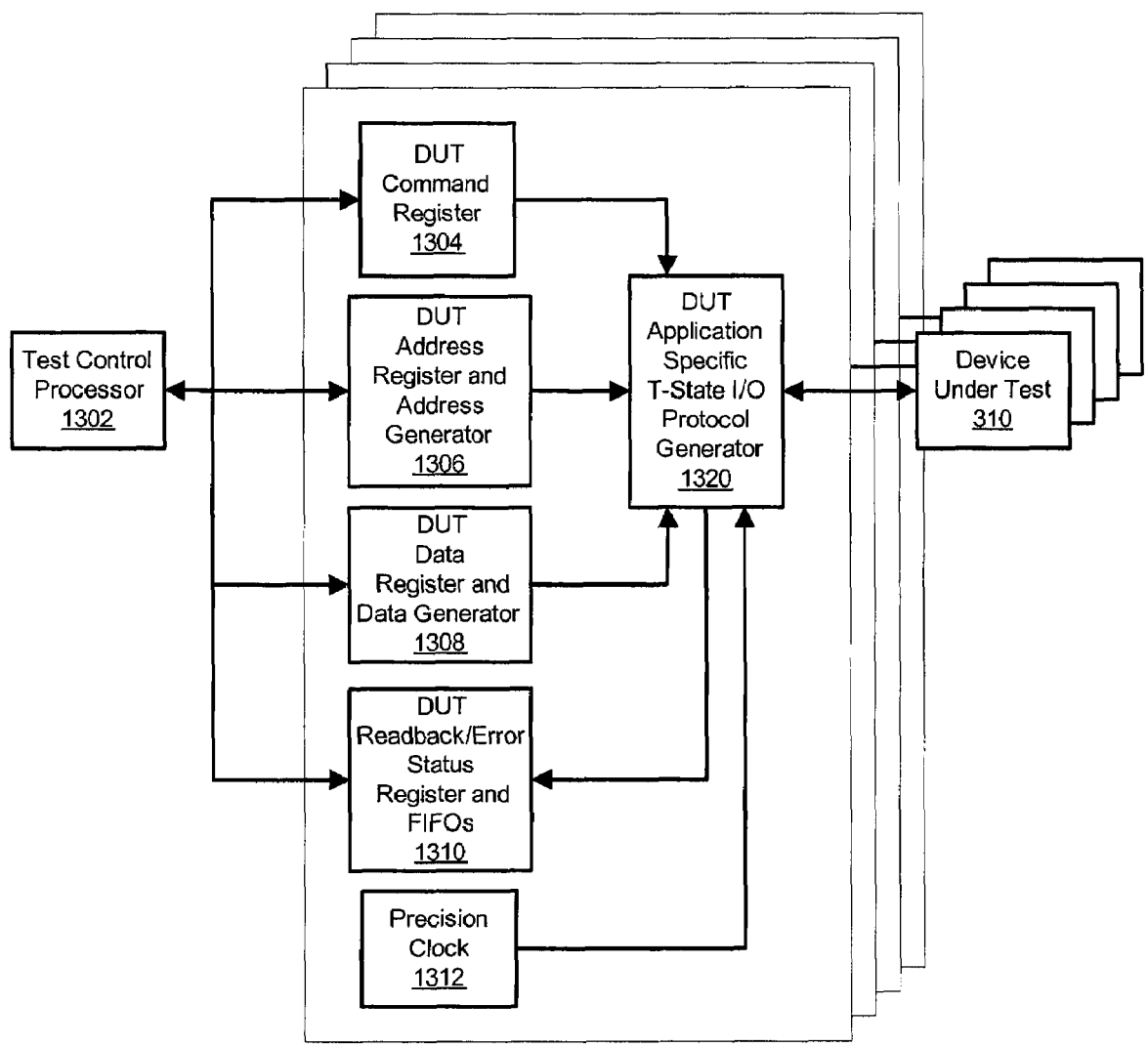
FIG. 16 illustrates an environment with multiple devices-under-test in a PTSTE in accordance with one embodiment of the present invention.

The action of writing the DUT operation command to the command register, initiates the T-State I/O Protocol Generator to execute the instruction sequence on the DUT. The PTSTE 1300 can also be configured to test multiple devices in parallel. In this configuration one processor with multiple T-state protocol generators 1320 is used, one T-state protocol generator 1320 can be used for each device under test 310. In alternate embodiments, one T-state protocol generator 1320 can be used with multiple DUTs 310. The test control processor 1302 can utilize a multitasking operating system to simplify test programs. FIG. 16 illustrates an environment with multiple devices-under-test in a PTSTE in accordance with one embodiment of the present invention.

Figure 15A:
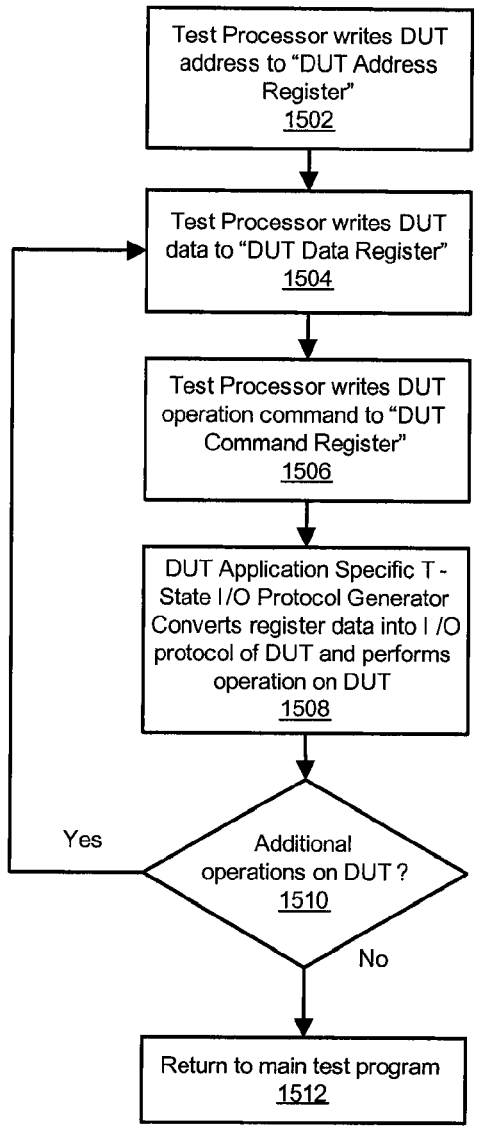
FIGS. 15(a) and 15(b) are flowcharts illustrating the PTSTE write and read operations in accordance with one embodiment of the present invention.
Figure 15B:
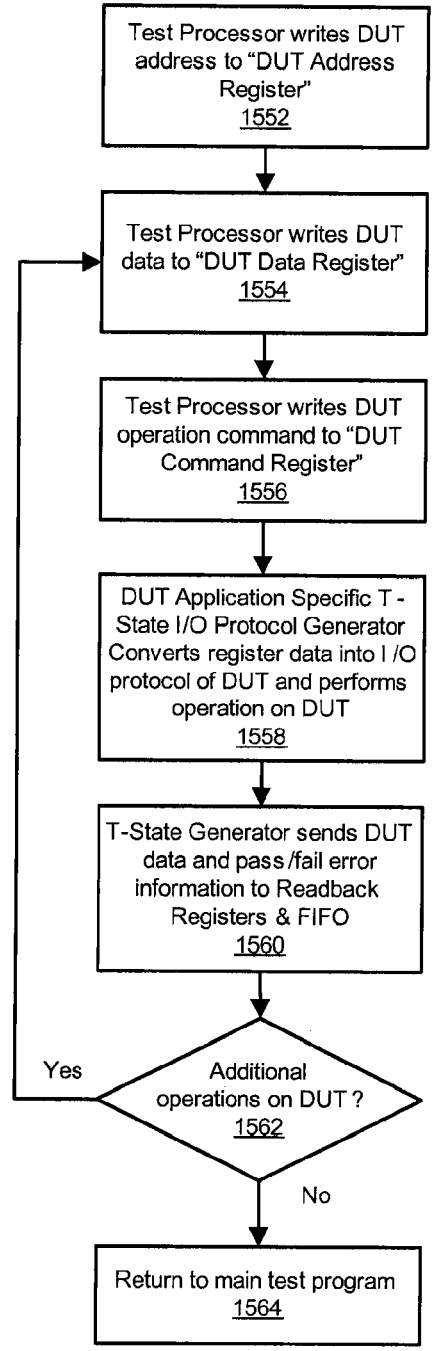

An example of how the PTSTE 1300 accomplishes this is described below with reference to FIGS. 15(*a*) and 15(*b*). FIG. 15(*a*) is a flowchart illustrating the PTSTE write operation in accordance with one embodiment of the present invention. The test processor 1302 writes 1502 the DUT address to the DUT address register 1306. The test processor 1302 also writes 1504 the DUT data to the DUT data register 1308. The test processor 1302 also writes 1506 operation commands to the DUT command register 1304. The T-state protocol generator 1320 converts 1508 register data into the input/output protocol of the DUT 310 and performs the operation in the DUT command register 1304 (e.g., a read operation) on the DUT 310. If 1510 there are additional operations to be performed on the DUT 310 the process continues at step 1504. Otherwise the process returns 1512 to the main test program.

FIG. 15(*b*) is a flowchart illustrating the PTSTE read operation in accordance with one embodiment of the present invention. The test processor 1302 writes 1552 the DUT address to the DUT address register 1306. The test processor 1302 also writes 1554 DUT data to the DUT data register 1308. The test processor 1302 also writes 1556 a DUT operation command to the DUT command register 1304. The T-state protocol generator 1320 converts 1558 the register data into the input/output protocol of the DUT 1558 and performs the operation in the DUT command register 1304 (e.g., a write operation) on the DUT 310. The T-state protocol generator 1320 sends 1560 DUT data and error information to DUT readback registers and FIFOs 1310. If 1562 there are additional operations to be performed on the DUT 310 the process continues at step 1554. Otherwise the process returns 1564 to the main test program.

Figure 17A:
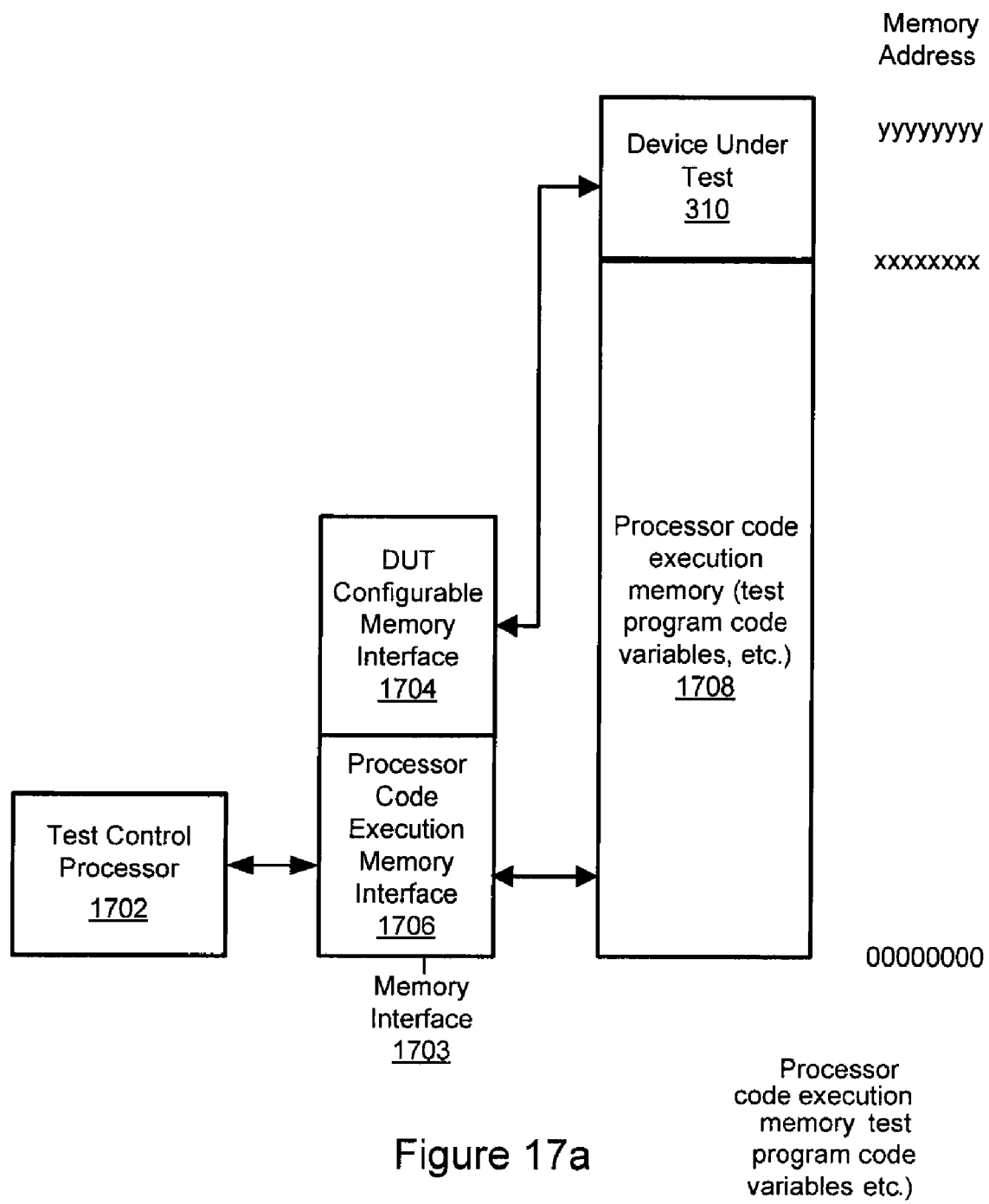
FIG. 17a is an illustration of a memory mapped DUT test engine (MMDTE) in accordance with one embodiment of the present invention.

A Memory Mapped DUT Test Engine (MMDTE) is another control stimulus/response system used to test memory devices. The MMDTE maps the DUT 310 directly into the memory space of the ASTE controller 1702. This allows the ASTE controller 1702 to directly access the DUT 310 as it would any of its other local memory 1708. The ASTE controller 1702 can therefore utilize native software to perform functional pattern tests, erases, pattern imprints, etc. on the DUT 310. This makes it easier to generate/code test programs. Another advantage of the MMDTE is that it tests the DUT 310 in the same type of environment that it will ultimately be used in, namely as a memory component in a microprocessor system (e.g., a cell phone, computer, etc.). FIG. 17*a* is an illustration of a memory mapped DUT test engine (MMDTE) in accordance with one embodiment of the present invention.

The MMDTE includes a test control processor 1702, a processor code execution memory 1708, a memory interface 1703 that includes a processor code execution memory interface 1706 and a configurable memory interface 1704 used to address the DUT 310. In one embodiment the configurable DUT memory interface 1704 utilizes configurable memory or logic, e.g., FPGA, to allow the MMDTE to address a variety of DUT memory interface types (e.g. multiplexed, non-multiplexed, etc.).

Figure 17B:
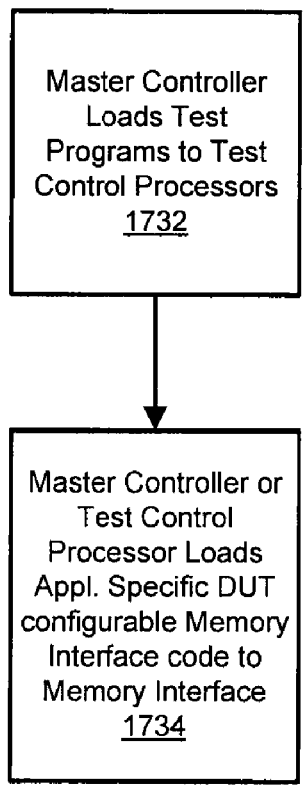
FIGS. 17b and 17c are flow charts illustrating the operation of the MMDTE in accordance with one embodiment of the present invention.
Figure 17C:
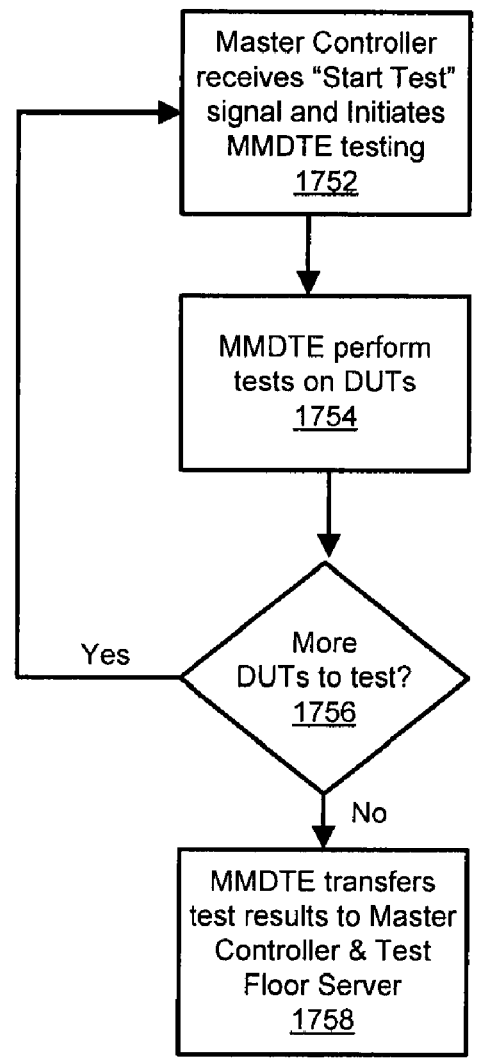

FIGS. 17*b* and 17*c* are flow charts illustrating the set-up and testing operations of the MMDTE in accordance with one embodiment of the present invention. The MMDTE setup is described in FIG. 17*b* where the master controller 302 loads 1732 test programs into test control processors 1302. The master controller 302 or test control processor 1302 loads 1734 application specific DUT configurable memory interface code into the memory interface 1704. The MMDTE testing mode is described in FIG. 17*c* where the master controller 302 receives 1752 a start test signal and initiates MMDTE testing. The MMDTE performs 1754 tests on the DUTs 310. If 1756 there are more DUTs 310 to test the process continues at step 1752. Otherwise 1756, the MMDTE transfers 1758 test results to a master controller 302 and a test floor server 1758.

Figure 18:
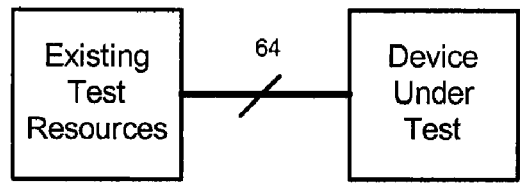
FIG. 18 illustrates an example of a DUT using conventional systems.

One example of an Application Specific Distributed Test Option implementation is now forth with in FIG. 18. FIG. 18 illustrates an example of a DUT using conventional systems. The implementation is on an existing 16 site, one tester per site system. Each site in the existing system has 64 tester I/O channels. A single test site of this system is shown in FIG. 18 where the ETR and DUT are replicated 16 times in one test system in order to test 16 devices in parallel.

Figure 19:
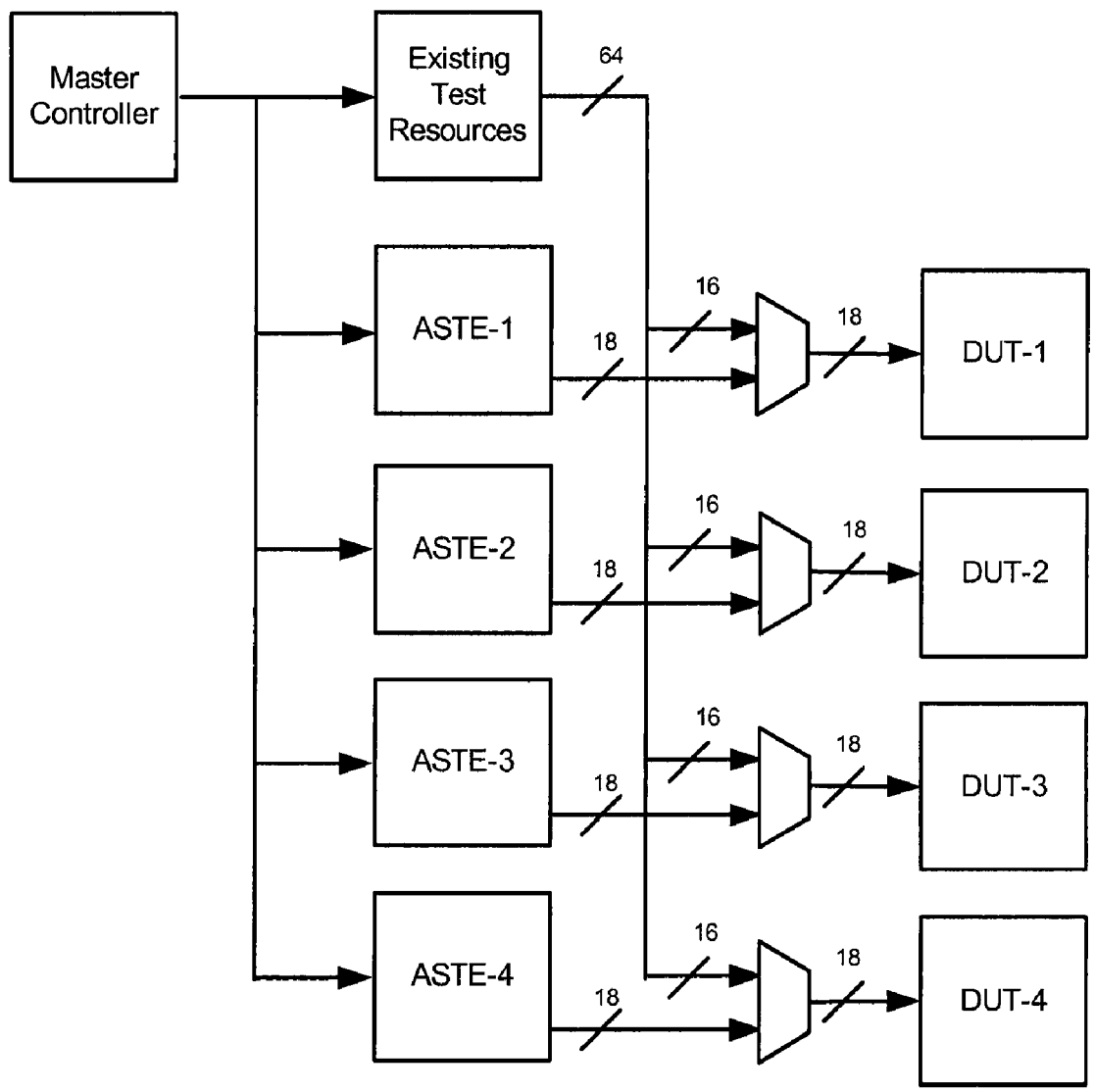
FIG. 19 illustrates an example of DUTs using the testing system according to an embodiment of the present invention.

FIG. 19 illustrates an example of DUTs using the testing system according to an embodiment of the present invention. The system was modified to add the ASDTO. The system is now capable of testing 64 devices by replicating all of the elements in FIG. 19 sixteen times, with the exception of the master controller which is only needed once per system, although multiple master controller can be used in alternate embodiments. The implementation of the test option in this example provides the following test benefits: (1) the parallel test capability of the original test system has been increased from 16 devices in parallel to 64 devices in parallel; (2) the test engines increase the test data rate to the DUTs from the original 10 MHz to 50 MHz; (3) the test engines increase the number of I/O channels available from the original 64 channels to 4×18=72 channels; (4) the test engines can be reconfigured to the following (under software control): (a) 1 Test Engine with 72 channels, (b) 2 Test Engines with 36 channels each, (c) 4 Test Engines with 18 channels each (shown), (d) 8 Test Engines with 9 channels each or (e) 16 Test Engines with 4 channels each; (5) simplified test program development since each DUT has dedicated test resources and (6) 4 to 5 times the test throughput of the manufacturers factory.

Figure 20:
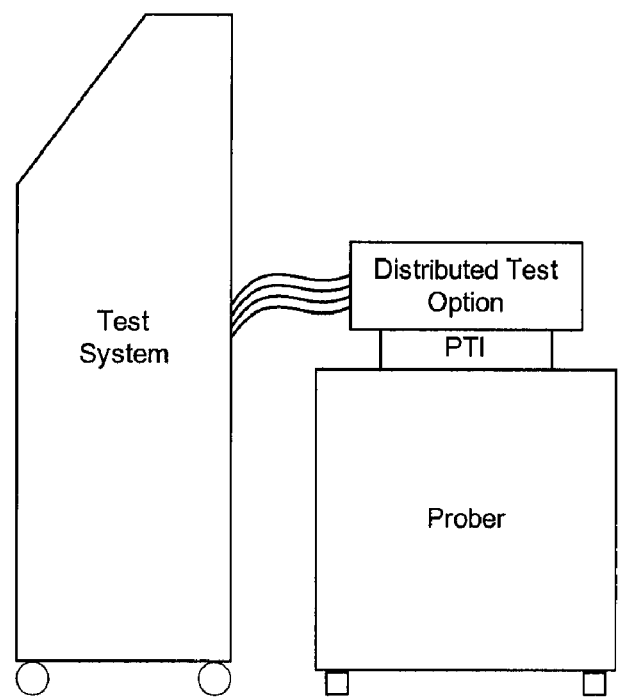
FIG. 20 is an illustration of a distributed test environment with an integration into the probe test cell in accordance with one embodiment of the present invention.
Figure 21:
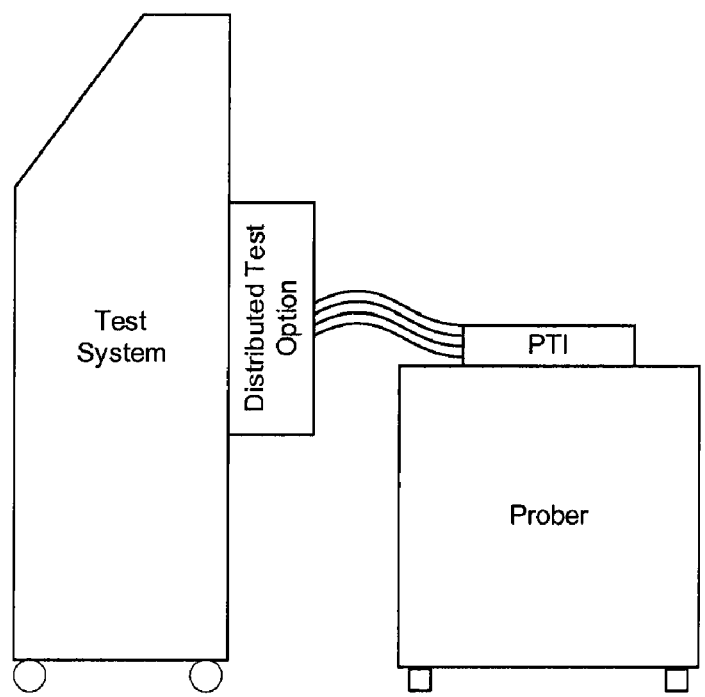
FIG. 21 is an illustration of a distributed test environment with an integration into the probe test cell in accordance with another embodiment of the present invention.

As described above, the Distributed Test Option can be a new system or can be added to an existing test system. FIG. 20 is an illustration of a distributed test environment with an integration into the probe test cell in accordance with one embodiment of the present invention. FIG. 21 is an illustration of a distributed test environment with an integration into the probe test cell in accordance with another embodiment of the present invention. In FIGS. 20 and 21 the distributed test option is coupled to a prober/tester interface (PTI) and to the test system.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A distributed test system for testing one or more devices under test including a first device under test, wherein said devices under test include integrated circuits, the distributed test system comprising:

programmable devices comprising at least one of field programmable gate arrays, programmable logic devices, or complex programmable logic devices, wherein the programmable devices are software programmable in the testing environment to change the number of application specific test engines (ASTEs) in the distributed test system, wherein the programmable devices are software programmable in the testing environment to change the functionality of the ASTEs, and wherein the programmable devices are software programmable in the testing environment to change the number of tester channels associated with each application specific test engine (ASTE);

a first ASTE of said number of ASTEs that generates first test signals for the first device under test, wherein the first ASTE is programmable in the testing environment to enable modification of a type of stimulus response including said first test signals based upon a type of said first device under test;

an existing test unit to generate a defined set of defined test signals; and a switch matrix including a first switch for connecting the first device under test to the first ASTE or the existing test unit; and a controller, coupled to the switch matrix and the one or more ASTEs, for determining connections made by said switch matrix;

wherein said first ASTE transmits said first test signals to the first device under test and receives a first response based upon said first test signals from the first device under test when the first switch couples the first ASTE to the first device under test.

2. The distributed test system of claim 1, wherein the first ASTE identifies errors in the first response representing one or more errors in the first device under test.

3. The distributed test system of claim 1, wherein the first test signals are programmed based upon a type of the first device under test.

4. The distributed test system of claim 1, wherein the first ASTE includes a first T-state protocol generator that converts first test commands to said first test signals, wherein said first test signals are compatible with a first protocol used by the first device under test, wherein said first test commands are testing commands that are not consistent with the first protocol.

5. The distributed test system of claim 1, wherein said first ASTE comprises:

a first memory unit; and a first processor wherein a memory of the first device under test is mapped into the first memory unit.

6. The distributed test system of claim 1, further comprising:

a second ASTE of said number of ASTEs that generates first test signals for a second device under test of said one or more devices under test, wherein the second ASTE is programmable in the testing environment to enable modification of a type of stimulus response including said second test signals based upon a type of said second device under test wherein said type of stimulus response is at least one of an algorithmic pattern generator (APG), a built in self test (BIST) or a T-state protocol generator; and a second switch of said switch matrix for connecting the second device under test to one of the second ASTE or the existing test unit;

wherein said second ASTE transmits said second test signals to the second device under test and receives a second response based upon said second test signals from the second device under test when the second switch couples the second ASTE to the second device under test.

7. The distributed test system of claim 6, wherein the second ASTE identifies errors in the second response representing one or more errors in the second device under test.

8. The distributed test system of claim 6, wherein the second test signals are programmed based upon a type of the second device under test.

9. The distributed test system of claim 6, wherein the second ASTE includes a second T-state protocol generator that converts second test commands to said second test signals, wherein said second test signals are compatible with a second protocol used by the second device under test, wherein said second test commands are testing commands that are not consistent with the second protocol.

10. The distributed test system of claim 6, wherein said second ASTE comprises:

a second memory unit; and a second processor wherein a memory of the second device under test is mapped into the second memory unit.

11. The system of clam 1 wherein said type of stimulus response is at least one of an algorithmic pattern generator (APG), a built in self test (BIST) or a T-state protocol generator.

12. A distributed test system for testing one or more devices under test including a first device under test, wherein said devices under test include integrated circuits, the distributed test system comprising:

programmable devices comprising at least one of field programmable gate arrays, programmable logic devices, or complex programmable logic devices, wherein the programmable devices are software programmable in the testing environment to change the number of application specific test engines (ASTEs) in the distributed test system, wherein the programmable devices are software programmable in the testing environment to change the functionality of the ASTEs, and wherein the programmable devices are software programmable in the testing environment to change the number of tester channels associated with each application specific test engine (ASTE);

a first ASTE of said number of ASTEs that generates first test signals for the first device under test, wherein the first ASTE is programmable in the testing environment to enable modification of a type of stimulus response including said first test signals based upon a type of said first device under test; and wherein said first ASTE transmits said first test signals to the first device under test and receives a first response based upon said first test signals from the first device under test.

13. The distributed test system of claim 12 further comprising:
   a shared input unit to generate a set of shared test signals;
   a switch matrix including a first switch for connecting the first device under test to the first ASTE or the shared input unit; and
   a controller, coupled to the switch matrix, the one or more ASTEs and the shared input unit, for determining connections made by said switch matrix.

14. The distributed test system of claim 12, wherein the first ASTE identifies errors in the first response representing one or more errors in the first device under test.

15. The distributed test system of claim 12, wherein the first test signals are programmed based upon a type of the first device under test.

16. The distributed test system of claim 12, wherein the first ASTE includes a first T-state protocol generator that converts first test commands to said first test signals, wherein said first test signals are compatible with a first protocol used by the first device under test, wherein said first test commands are testing commands that are not consistent with the first protocol.

17. The distributed test system of claim 12, further comprising:
   a second ASTE of said number of ASTEs that generates second test signals for a second device under test of said one or more devices under test, wherein the second ASTE is programmable in the testing environment to enable modification of a type of stimulus response including said second test signals wherein said type of stimulus response is at least one of an algorithmic pattern generator (APG), a built in self test (BIST) or a T-state protocol generator; and
   wherein said second ASTE transmits said second test signals to the second device under test and receives a second response based upon said second test signals from the second device under test when the second switch couples the second ASTE to the second device under test.

18. The distributed test system of claim 17, further comprising a second switch of said switch matrix for connecting the second device under test to one of the second ASTE or the shared input unit.

19. The distributed test system of claim 12, wherein said first ASTE comprises:
   a first memory unit; and
   a first processor wherein a memory of the first device under test is mapped into the first memory unit.

20. The system of clam 12 wherein said type of stimulus response is at least one of an algorithmic pattern generator (APG), a built in self test (BIST) or a T-state protocol generator.

21. A method for testing one or more devices under test, including a first device under test, wherein the devices under test comprise integrated circuits, the method comprising:
   loading defined test program into an existing test unit;
   loading configuration files, including a programmable stimulus response test program into a first testing unit in the testing environment based upon a type of the device under test, wherein a type of said stimulus response test program is programmable in the testing environment, wherein said configuration files also control the number of application specific test engines (ASTEs), the functionality of each of the ASTEs, and the number of tester channels associated with each application specific test engine (ASTE), and wherein said configuration files are software programmable in the testing environment;
   coupling the first device under test to one of said existing test unit or said first testing unit based upon a type of testing;
   generating first test signals from said first testing unit;
   transmitting said first test signals to the first device under test;
   receiving a first response based upon said first test signals from the first device under test when the first switch couples the first testing unit to the first device under test; and
   identifying errors in said first response representing one or more errors in the first device under test.

22. The method of claim 21, further comprising the step of:
   reprogramming said first test signals based upon a type of the first device under test;
   loading new configurations files including said reprogrammed first test signals into the first testing unit.

23. The method of claim 21, wherein said configuration files include first test commands, further comprising the step of:
   converting first test commands to said first test signals, wherein said first test signals are compatible with a first protocol used by the first device under test, wherein said first test commands are testing commands that are not consistent with the first protocol.

24. The method of claim 21 further comprising the step of:
   mapping a memory in the first device under test into a first memory of said first testing unit.

25. The method of clam 21 wherein said type of stimulus response is at least one of an algorithmic pattern generator (APG), a built in self test (BIST) or a T-state protocol generator.

* * * * *

UNITED STATES PATENT AND TRADEMARK OFFICE
CERTIFICATE OF CORRECTION

PATENT NO. : 7,552,370 B2  Page 1 of 1
APPLICATION NO. : 11/694685
DATED : June 23, 2009
INVENTOR(S) : Robert Pochowski It is certified that error appears in the above-identified patent and that said Letters Patent is hereby corrected as shown below:

Column 14, Claim 6, line 9 replace "first" with --second--.

Column 16, Claim 21, line 10 replace "loading" with --loading a--.

Signed and Sealed this

Eleventh Day of August, 2009

David J. Kappos
*Director of the United States Patent and Trademark Office*